(12) United States Patent  (10) Patent No.: US 8,256,707 B2
Suciu et al.  (45) Date of Patent: Sep. 4, 2012

(54) ENGINE MOUNTING CONFIGURATION FOR A TURBOFAN GAS TURBINE ENGINE

(75) Inventors: Gabriel L. Suciu, Glastonbury, CT (US); Jon A. Marx, Manchester, CT (US); Brian D. Merry, Andover, CT (US); Craig A. Nordeen, Manchester, CT (US); Christopher M. Dye, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 1692 days.

(21) Appl. No.: 11/832,107

(22) Filed: Aug. 1, 2007

(65) Prior Publication Data

US 2009/0056343 A1   Mar. 5, 2009

(51) Int. Cl.
*B64D 27/00* (2006.01)
(52) U.S. Cl. .......................................................... 244/54
(58) Field of Classification Search ................... 244/54, 244/53 R; 60/796–797; 248/554
See application file for complete search history.

(56) References Cited

U.S. PATENT DOCUMENTS

| | | | |
|---|---|---|---|
| 3,327,971 A * | 6/1967 | Stewart et al. | 244/54 |
| 4,037,809 A * | 7/1977 | Legrand | 244/54 |
| 4,044,973 A * | 8/1977 | Moorehead | 244/54 |
| 4,266,741 A * | 5/1981 | Murphy | 244/54 |
| 4,966,338 A | 10/1990 | Gordon | |
| 5,136,839 A | 8/1992 | Armstrong | |
| 5,174,525 A | 12/1992 | Schilling | |
| 5,273,393 A | 12/1993 | Jones et al. | |
| 5,275,357 A | 1/1994 | Seelen et al. | |
| 5,277,382 A | 1/1994 | Seelen et al. | |
| 5,320,307 A | 6/1994 | Spofford et al. | |
| 5,372,338 A | 12/1994 | Carlin et al. | |
| 5,409,184 A | 4/1995 | Udall et al. | |
| 5,443,229 A | 8/1995 | O'Brien et al. | |
| 5,452,575 A | 9/1995 | Freid | |
| 5,474,258 A | 12/1995 | Taylor et al. | |
| 5,497,961 A | 3/1996 | Newton | |
| 5,746,391 A | 5/1998 | Rodgers et al. | |
| 5,810,287 A | 9/1998 | O'Boyle et al. | |
| 5,860,276 A | 1/1999 | Newton | |
| 5,871,175 A | 2/1999 | Demouzon et al. | |
| 5,871,176 A * | 2/1999 | Demouzon et al. | 244/54 |
| 5,871,177 A | 2/1999 | Demouzon et al. | |
| 5,921,500 A | 7/1999 | Ellis et al. | |
| 5,927,644 A | 7/1999 | Ellis et al. | |
| 6,126,110 A | 10/2000 | Seaquist et al. | |
| 6,138,949 A | 10/2000 | Manende et al. | |
| 6,189,830 B1 | 2/2001 | Schnelz et al. | |
| 6,474,597 B1 | 11/2002 | Cazenave | |
| 6,517,027 B1 | 2/2003 | Abruzzese | |
| 6,652,222 B1 | 11/2003 | Wojtyczka et al. | |
| 6,708,925 B2 * | 3/2004 | Udall | 244/54 |

(Continued)

FOREIGN PATENT DOCUMENTS

GB   2010969   * 12/1977 ...................... 244/54

*Primary Examiner* — Tien Dinh
(74) *Attorney, Agent, or Firm* — Carlson Gaskey & Olds P.C.

(57) ABSTRACT

An engine mounting configuration reacts engine thrust at an aft mount. The engine mounting configuration reduces backbone bending of the engine, intermediate case distortion and frees-up space within the core nacelle.

21 Claims, 16 Drawing Sheets

U.S. PATENT DOCUMENTS

| | | |
|---|---|---|
| 6,899,518 B2 | 5/2005 | Lucas et al. |
| 6,935,591 B2 * | 8/2005 | Udall .............................. 244/54 |
| 7,021,585 B2 | 4/2006 | Loewenstein et al. |
| 7,055,330 B2 | 6/2006 | Miller |
| 7,134,286 B2 | 11/2006 | Markarian et al. |
| 7,677,493 B2 * | 3/2010 | Diochon et al. ................ 244/54 |
| 2006/0090448 A1 | 5/2006 | Henry |
| 2006/0248900 A1 | 11/2006 | Suciu et al. |

* cited by examiner

ENGINE MOUNTING CONFIGURATION FOR A TURBOFAN GAS TURBINE ENGINE

BACKGROUND OF THE INVENTION

The present invention relates to an engine mounting configuration, and more particularly to an engine mounting configuration for mounting a turbofan gas turbine engine to an aircraft pylon.

A gas turbine engine may be mounted at various points on an aircraft such as a pylon integrated with an aircraft structure. An engine mounting configuration ensures the transmission of loads between the engine and the aircraft structure. The loads typically include the weight of the engine, its thrust, aerodynamic loads, maneuver loads, and rotary torque about the engine axis. The engine mounting configuration must also absorb the deformations to which the engine is subjected during different flight phases and the dimensional variations due to thermal expansion and retraction.

One conventional engine mounting configuration includes a pylon having a forward mount and an aft mount. The front mount handles the thrust load from the engine as well as vertical and side loads from the front of the engine. The rear mount handles vertical and side loads from the rear of the engine and the engine torque.

Although effective, one disadvantage of this mounting arrangement is the relatively large "punch loads" into the engine cases from the thrust links which react the thrust from the engine and couple the thrust to the pylon. These loads tend to distort the intermediate case, low pressure compressor (LPC), fan, and high pressure compressor (HPC) cases. The distortion can cause the clearances between the static cases and rotating blade tips to increase. This may negatively affect engine performance and increase fuel burn.

Furthermore, when reacting thrust at the front mount, the engine centerline is deflected downward therefrom. The engine centerline may be still further deflected downward from the nacelle air load when the aircraft rotates while taking off. To accommodate this centerline deflection, the engine compressor and turbine blade require larger tip clearances which may negatively affect engine performance.

Accordingly, it is desirable to provide an engine mounting configuration which minimizes backbone bending and engine case distortion.

SUMMARY OF THE INVENTION

The engine mounting configuration according to the present invention reacts the engine thrust at an aft mount. This reduces engine backbone bending. By reacting thrust at the rear mount, the engine centerline is bent upwards therefrom. The nacelle air load during takeoff rotation operates to counteract the thrust load. The cumulative effect is a minimization of blade tip clearance requirements which improves engine performance. Since intermediate case distortion is minimized, the intermediate case may readily support other engine components such as an engine accessory gearbox, pumps, an oil tank and such like, which thereby saves weight and space within the core compartment.

Another mounting configuration removes the side load from the front mount such that the front mount reacts only the vertical loads. The side loads are reacted through a fixed moment rear mount.

The present invention therefore provides an engine mounting configuration which minimizes backbone bending and engine case distortion.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION OF THE DISCLOSED EMBODIMENT

Figure 1A:
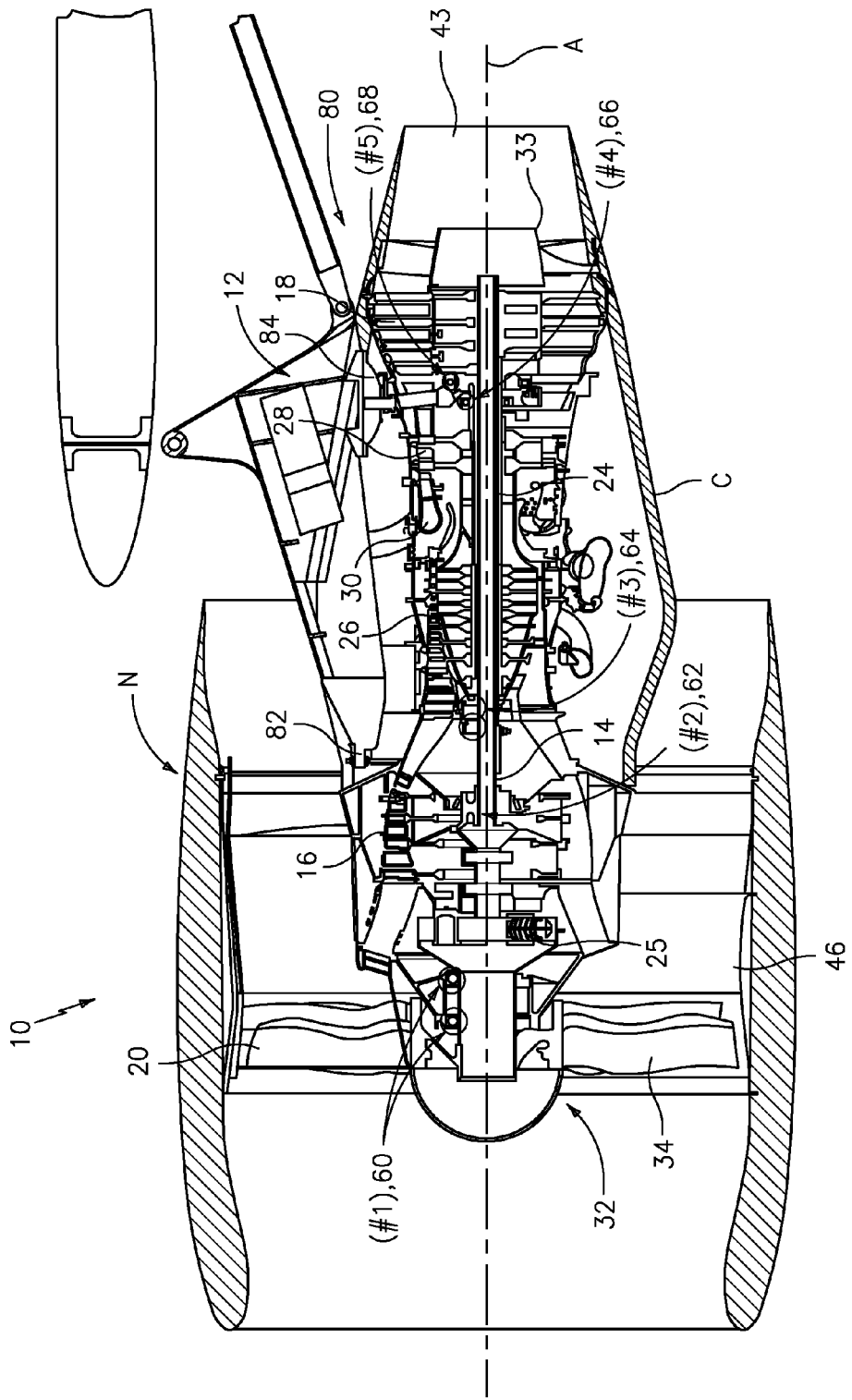
FIG. 1A is a general sectional view through a gas turbine engine along the engine longitudinal axis.

FIG. 1A illustrates a general partial fragmentary schematic view of a gas turbofan engine 10 suspended from an engine pylon 12 within an engine nacelle assembly N as is typical of an aircraft designed for subsonic operation.

The turbofan engine 10 includes a core engine within a core nacelle C that houses a low spool 14 and high spool 24. The low spool 14 includes a low pressure compressor 16 and low pressure turbine 18. The low spool 14 drives a fan section 20 connected to the low spool 14 either directly or through a gear train 25.

The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

Airflow enters the fan nacelle N which at least partially surrounds the core nacelle C. The fan section 20 communicates airflow into the core nacelle C to the low pressure compressor 16. Core airflow compressed by the low pressure compressor 16 and the high pressure compressor 26 is mixed with the fuel in the combustor 30 where is ignited, and burned. The resultant high pressure combustor products are expanded through the high pressure turbine 28 and low pressure turbine 18. The turbines 28, 18 are rotationally coupled to the compressors 26, 16 respectively to drive the compressors 26, 16 in response to the expansion of the combustor product. The low pressure turbine 18 also drives the fan section 20 through gear train 25. A core engine exhaust exits the core nacelle C through a core nozzle 43 defined between the core nacelle C and a tail cone 33.

Figure 1B:
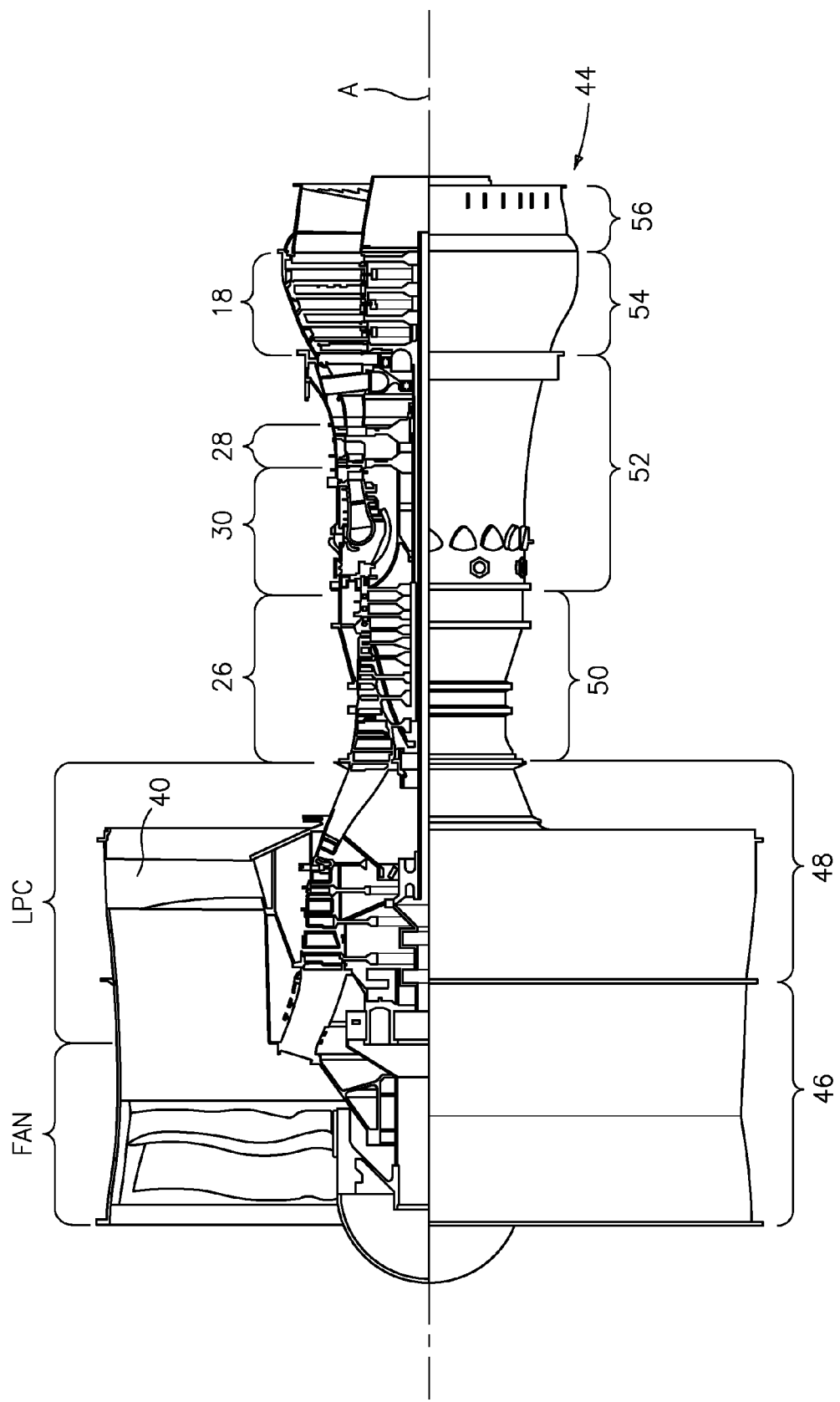
FIG. 1B is a general sectional view through a gas turbine engine along the engine longitudinal axis illustrating an engine static structure case arrangement on the lower half thereof.

The engine static structure 44 of FIG. 1B generally has sub-structures including a case structure often referred to as the engine backbone. The engine static structure 44 generally includes a fan case 46, an intermediate case (IMC) 48, a high pressure compressor case 50, a thrust case 52, a low pressure turbine case 54, and a turbine exhaust case 56 (FIG. 1B). The fan section 20 includes a fan rotor 32 with a plurality of circumferentially spaced radially outwardly extending fan blades 34. The fan blades 34 are surrounded by the fan case 46. The core engine case structure is secured to the fan case 46 at the IMC 48 which includes a multiple of circumferentially spaced radially extending struts 40 which radially span the core engine case structure and the fan case 46.

The engine static structure 44 further supports a bearing system upon which the turbines 28, 18, compressors 26, 16 and fan rotor 32 rotate. A #1 fan dual bearing 60 which rotationally supports the fan rotor 32 is axially located generally within the fan case 46. The #1 fan dual bearing 60 is preloaded to react fan thrust forward and aft (in case of surge). A #2 LPC bearing 62 which rotationally supports the low spool 14 is axially located generally within the intermediate case (IMC) 48. The #2 LPC bearing 62 reacts thrust. A #3 high spool thrust bearing 64 which rotationally supports the high spool 24 and also reacts thrust. The #3 high spool bearing 64 is also axially located generally within the IMC 48 just forward of the high pressure compressor case 50. A #4 bearing 66 which rotationally supports a rear segment of the high spool 14 reacts only radial loads. The #4 bearing 66 is axially located generally within the thrust case 52 in an aft section thereof. A #5 bearing 68 rotationally supports the rear segment of the low spool 14 and reacts only radial loads. The #5 bearing 68 is axially located generally within the thrust case 52 just aft of the #4 bearing 66. It should be understood that this is an exemplary configuration and any number of bearings may be utilized.

Figure 1C:
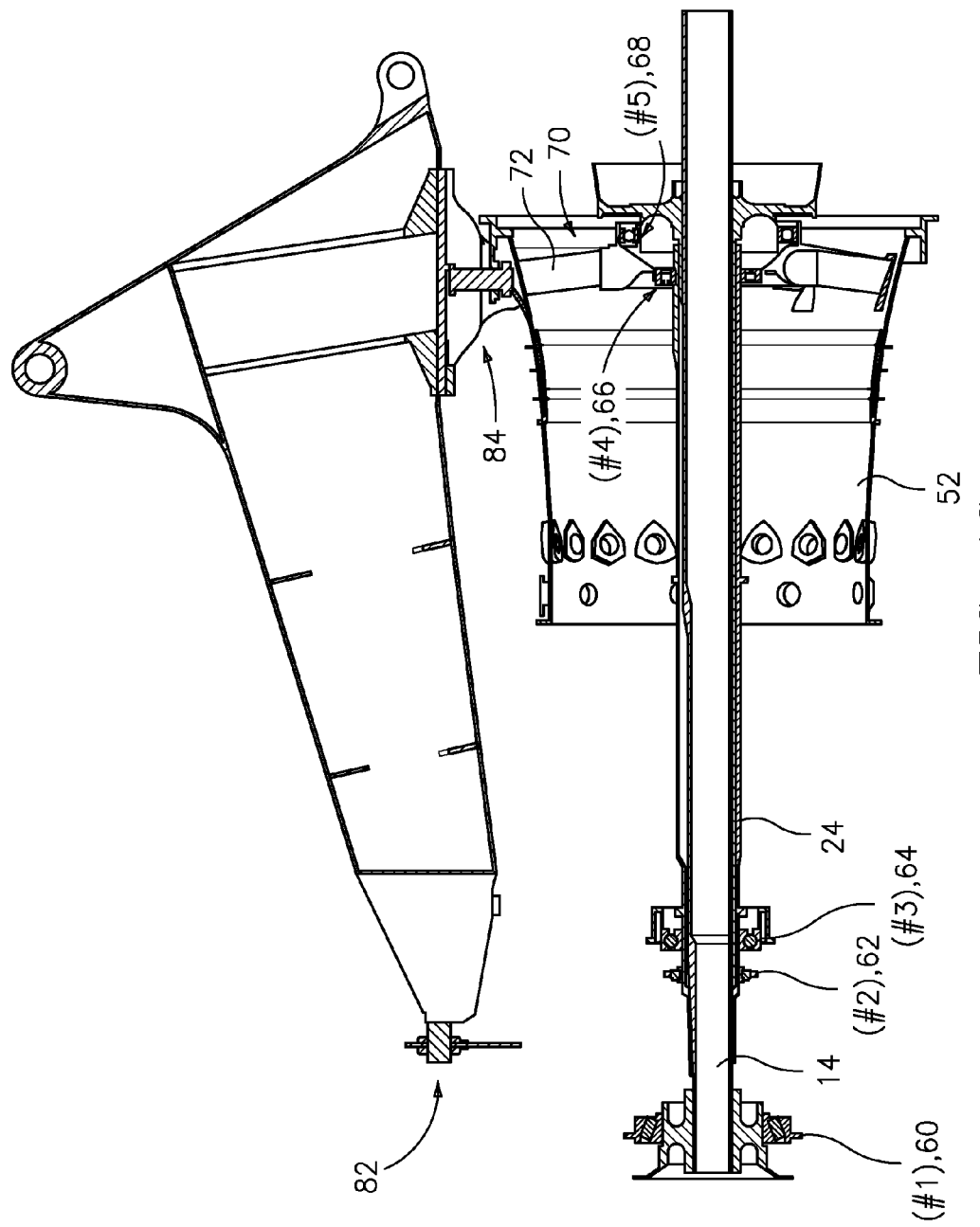
FIG. 1C is a side view of an engine mounting configuration illustrating a rear mount attached through an engine thrust case to a mid-turbine frame between a first and second bearing supported thereby.
Figure 1D:
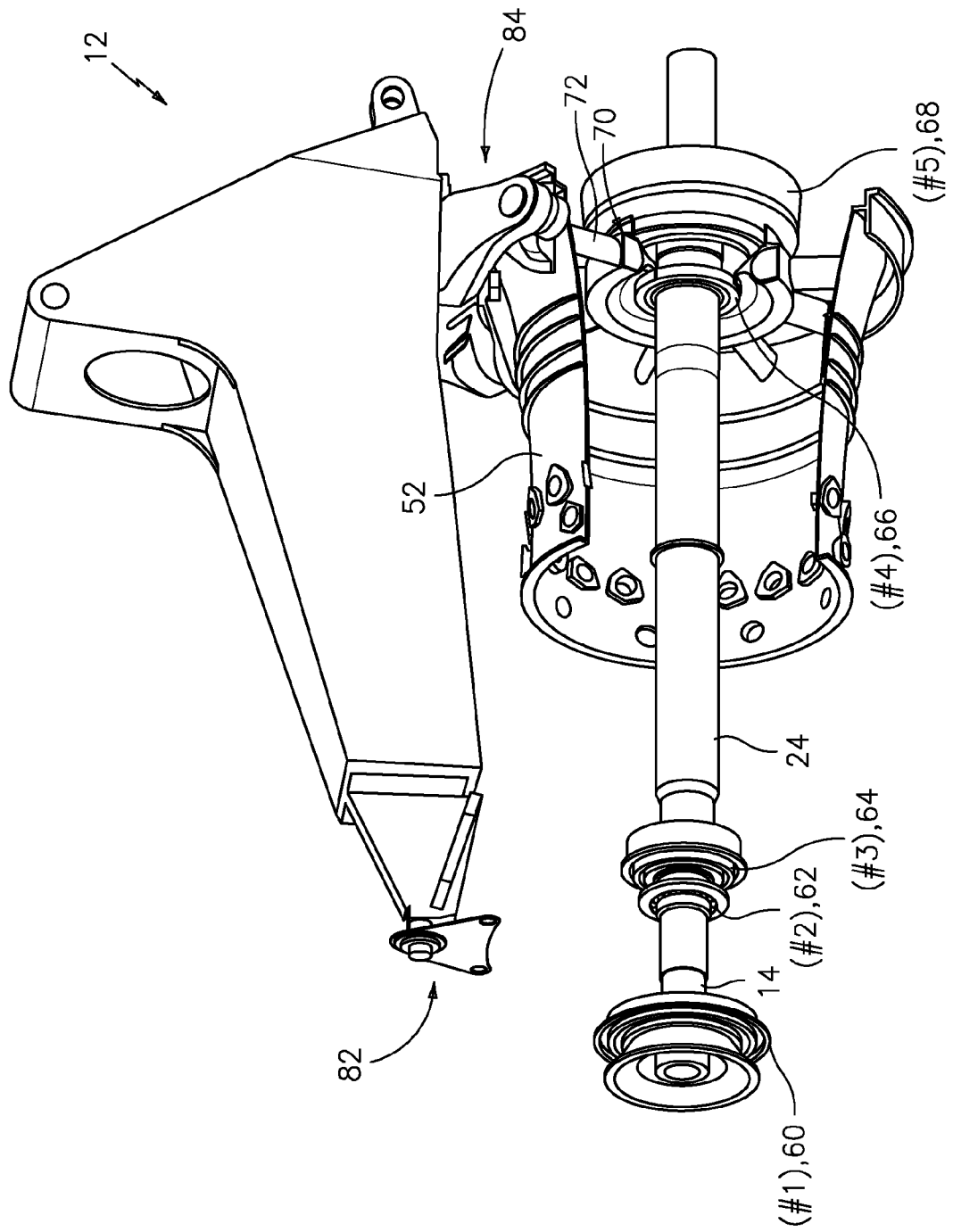
FIG. 1D is a front perspective view of an engine mounting configuration illustrating a rear mount attached through an engine thrust case to a mid-turbine frame between a first and second bearing supported thereby.
Figure 2A:
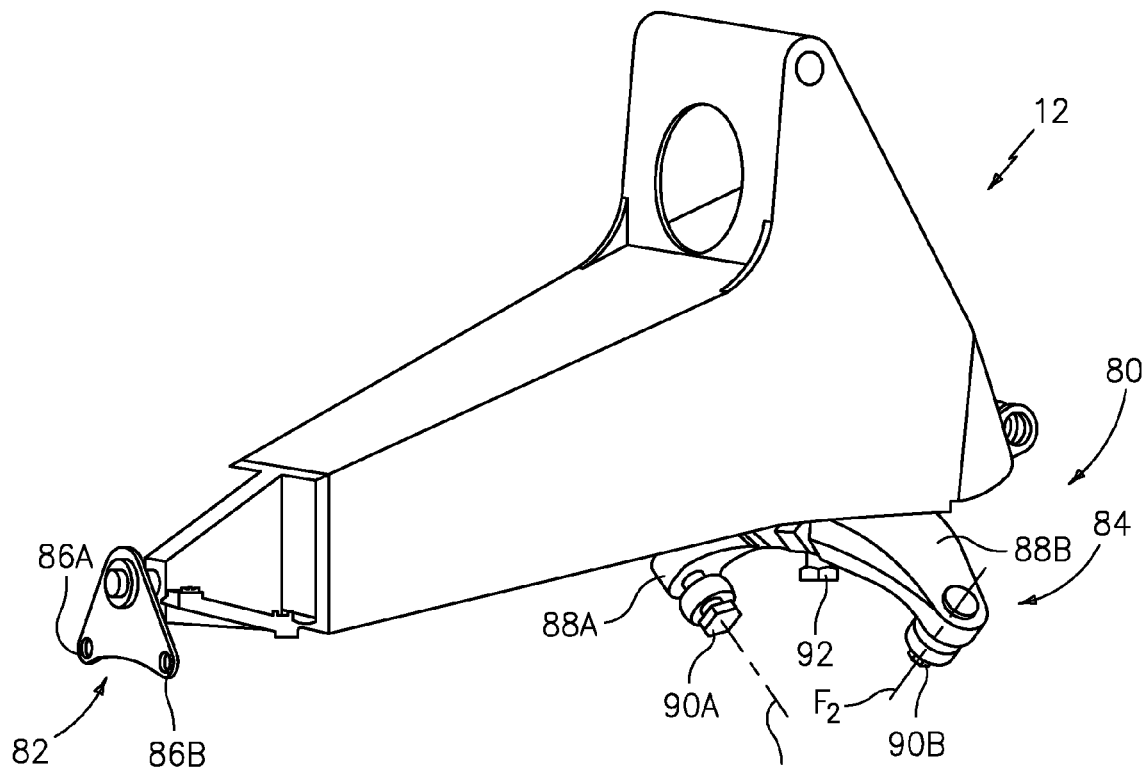
FIG. 2A is a front perspective view of an engine mount pylon illustrating the engine mounting configuration.
Figure 2B:
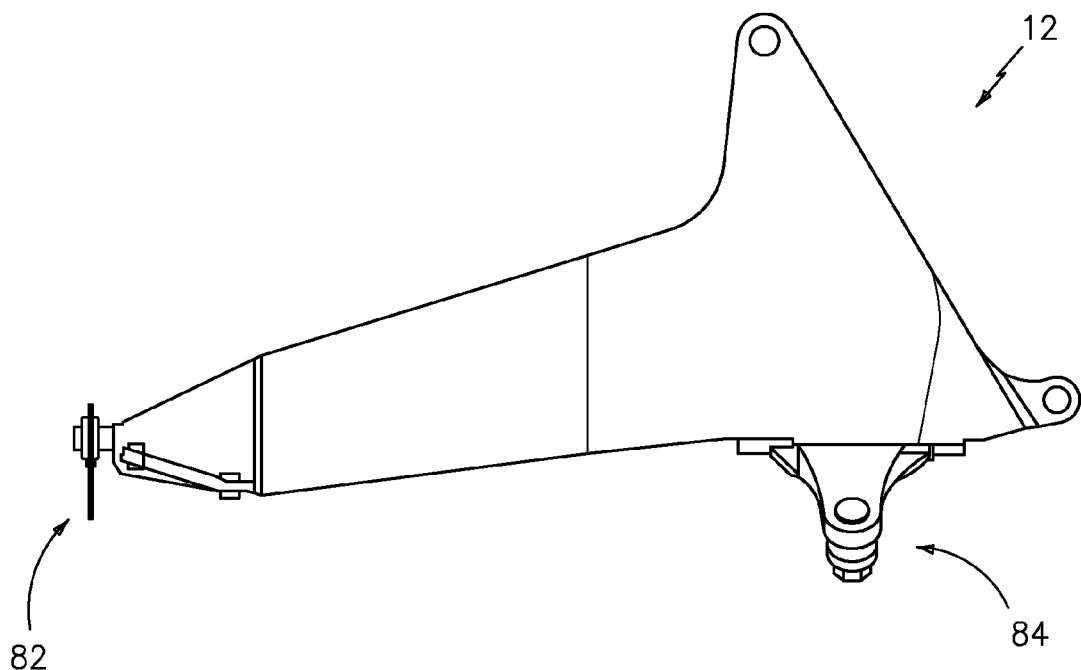
FIG. 2B is a side view of an engine mount pylon illustrating the engine mounting configuration.
Figure 2C:
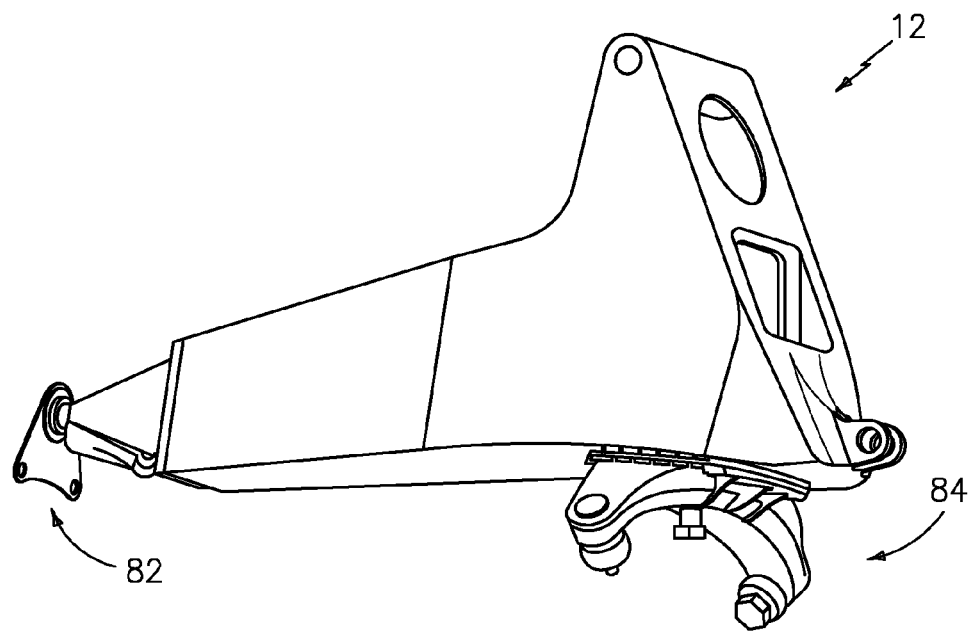
FIG. 2C is a rear perspective view of an engine mount pylon illustrating the engine mounting configuration.
Figure 2D:
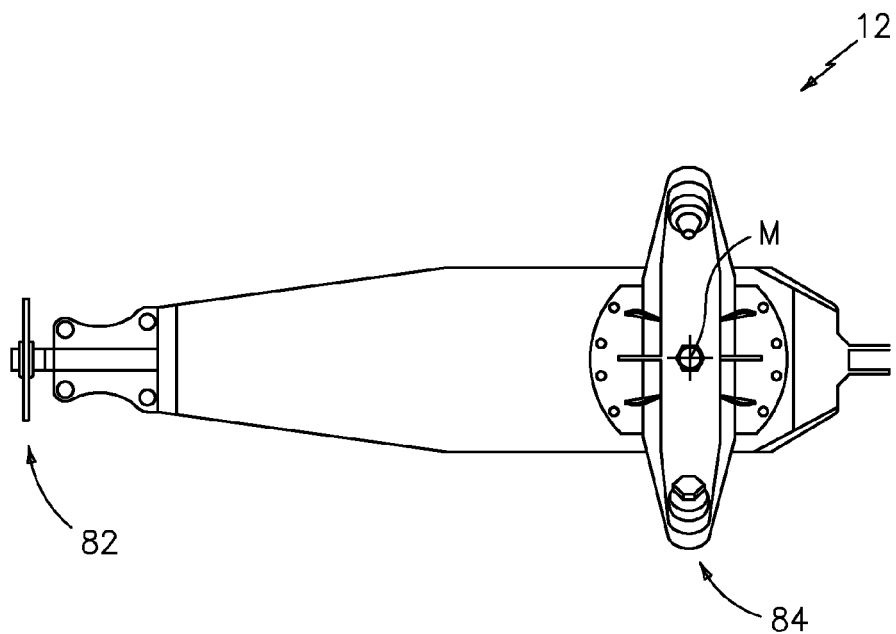
FIG. 2D is bottom view of an engine mount pylon illustrating the engine mounting configuration.
Figure 2E:
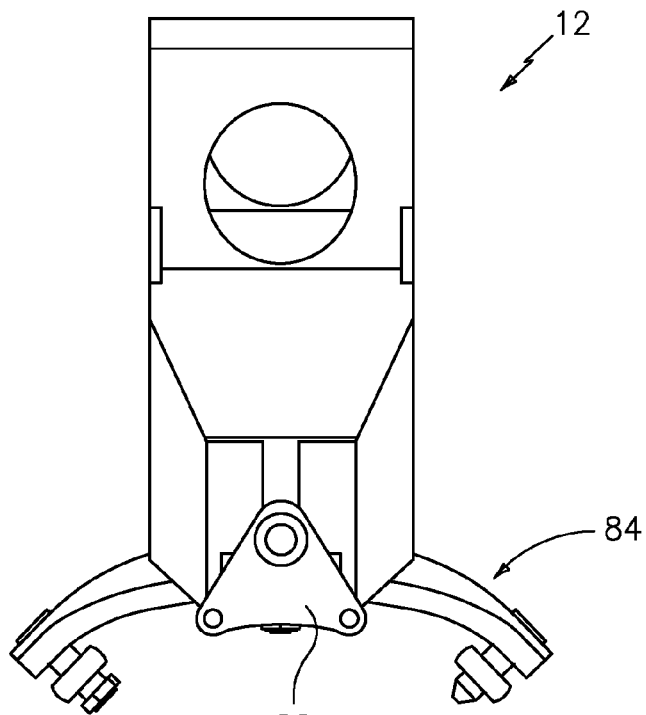
FIG. 2E is a front view of an engine mount pylon illustrating the engine mounting configuration.

The #4 bearing 66 and the #5 bearing 68 are supported within a mid-turbine frame (MTF) structure 70 to straddle radially extending structural struts 72 which are preloaded in tension (FIGS. 1C-1D). The MTF 70 provides aft structural support within the thrust case 52 for the #4 bearing 66 and the #5 bearing 68 which rotatably support the spools 14, 24.

A dual rotor engine such as that disclosed in the illustrated embodiment typically includes a forward frame and a rear frame that support the main rotor bearings. The intermediate case (IMC) 48 also includes the radially extending structural struts 40 which are generally radially aligned with the #2 LPC bearing 62 (FIG. 1A). It should be understood that various engines with various case and frame structures will benefit from the present invention.

The turbofan gas turbine engine 10 is mounted to aircraft structure such as an aircraft wing through an engine mounting configuration 80 defined by the pylon 12. The engine mounting configuration 80 includes a forward mount 82 and an aft mount 84 (FIGS. 2A-2E). The forward mount 82 is secured to the IMC 48 and the aft mount 84 is secured to the MTF 70 at the thrust case 52. The forward mount 82 and the aft mount 84 are arranged in a plane containing the axis A of the turbofan gas turbine 10. This eliminates the thrust links from the intermediate case, which frees up valuable space beneath the core nacelle and minimizes IMC 48 distortion.

Figure 3:
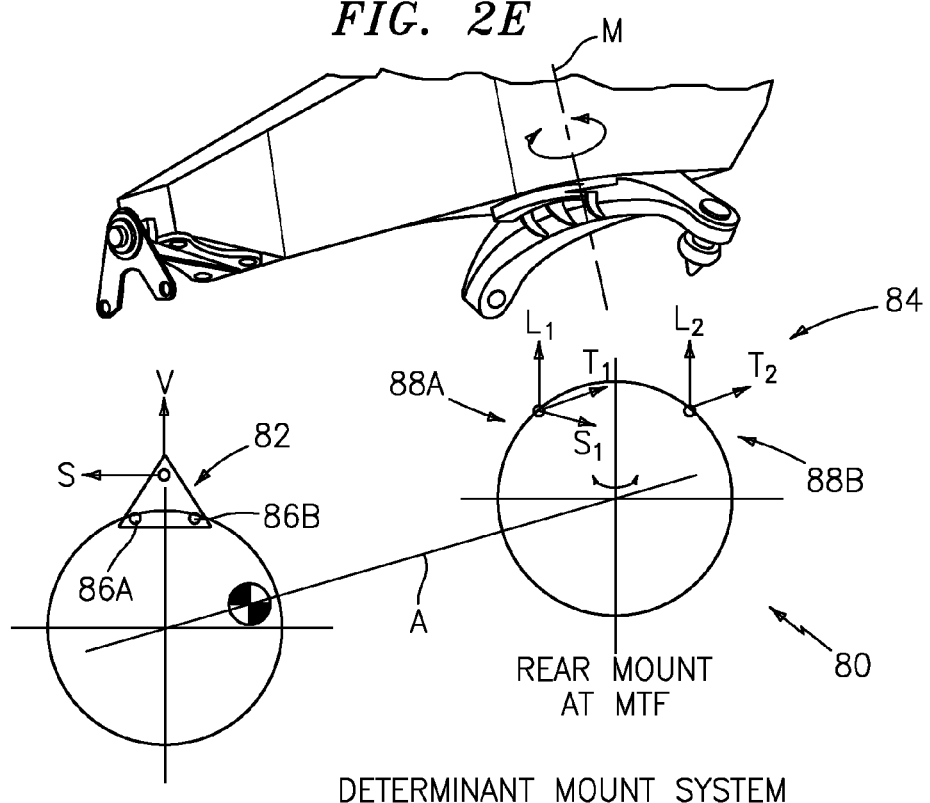
FIG. 3 is a free body diagram illustrating loads reacted by the engine mounting configuration.

Referring to FIG. 3, the engine mounting configuration 80 reacts the engine thrust at the aft end of the engine 10. The forward mount 82 supports vertical loads V and side loads S. The forward mount 82 includes a shackle arrangement which mounts to the IMC 48 at two points 86A, 86B. The forward mount 82 is generally a plate-like member which is oriented transverse to the plane which contains engine axis A. Fasteners are oriented through the forward mount 82 to engage the intermediate case (IMC) 48 generally parallel to the engine axis A.

The aft mount 84 includes a beam transverse to an engine axis A having a first arm 88A and a second arm 88B that mount to the MTF 70 at the thrust case 52 (FIGS. 2A-2E). It should be understood that the first arm 88A and the second arm 88B may alternatively mount to another rear area of the engine 10 such as the exhaust case or other frame area. It should also be understood that the MTF may alternatively be used with any engine case arrangement.

The first arm 88A includes an attachment fastener 90A and the second arm 88B includes an attachment fastener 90B defined along a respective fastener axis F1, F2 which extends radially inward to intersect the engine axis A. It should be understood that various bushings, vibration isolators and such like may additionally be utilized herewith.

The first arm 88A supports a link load L1, a sideload S and a thrust load T1. The second arm 88B supports a link load L2 and a thrust load T2. The link loads L1, L2 are torque loads generated by the design of the engine 10. The aft mount 84 is rotatable about an aft mount axis M (FIG. 2D) which vertically intersects the engine axis A. Rotation of the aft mount 84 maintains a determinant mount system such that T1 is always equal to T2. It should be understood that other arrangements which provide a determinant mount system where T1 equals T2 may alternatively or additionally be utilized. A failsafe pin 92 located along axis M is non-load bearing unless one or both of the attachment fasteners 90A, 90B were to fail.

Figure 4:
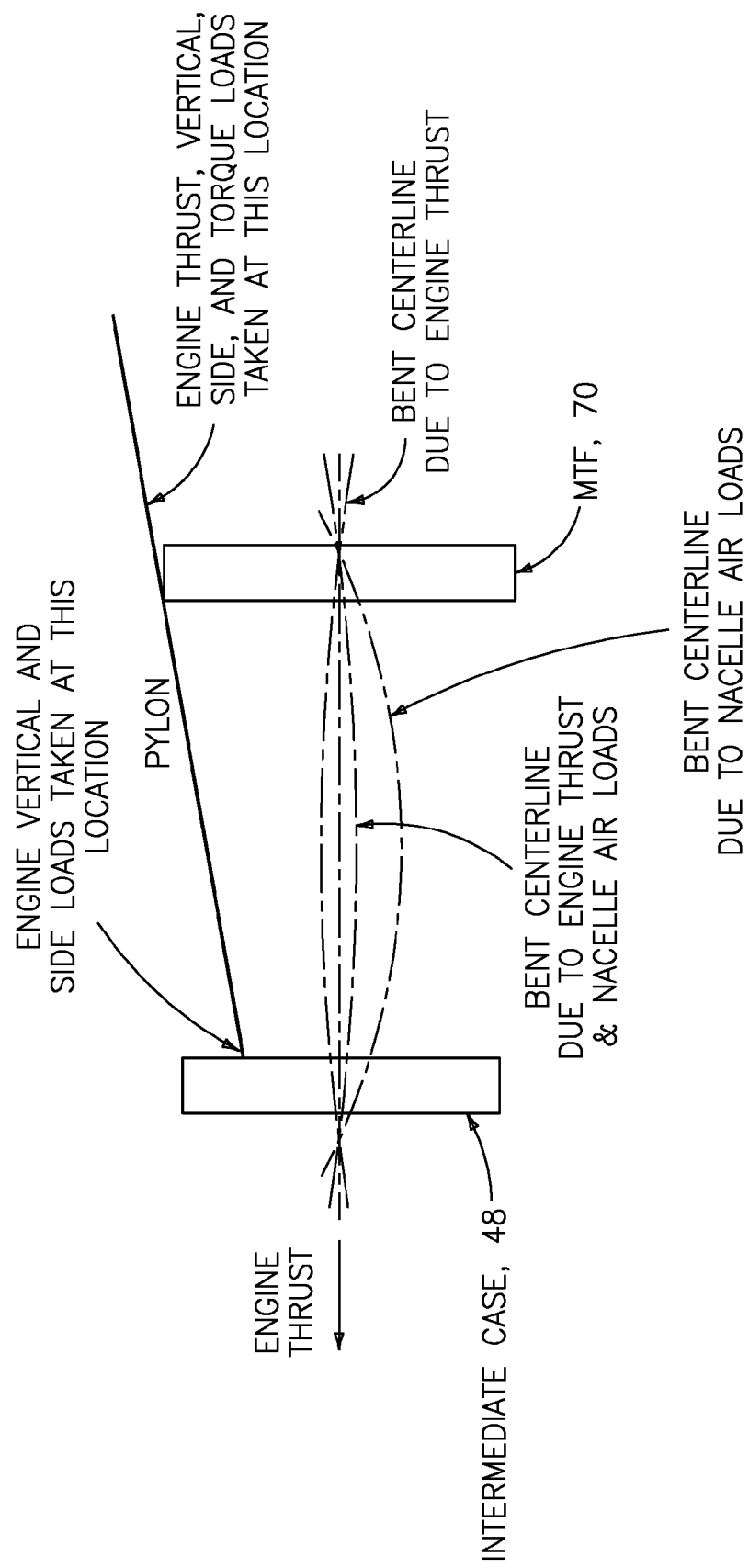
FIG. 4 is a schematic view of the engine mounting configuration illustrating engine centerline flexing due to engine thrust and nacelle air loads.

The engine mounting configuration 80 minimizes IMC 48 distortion as the change in thrust location reduces the amount of backbone bending in the engine. By reacting thrust at the rear mount 84, the engine centerline A is bent upwards in response to thrust loads (FIG. 4). The nacelle air load during takeoff rotation then operates to counteract the thrust load to bend the engine centerline A downward. This minimizes blade tip clearance requirements and thereby improves engine performance.

Figure 5A:
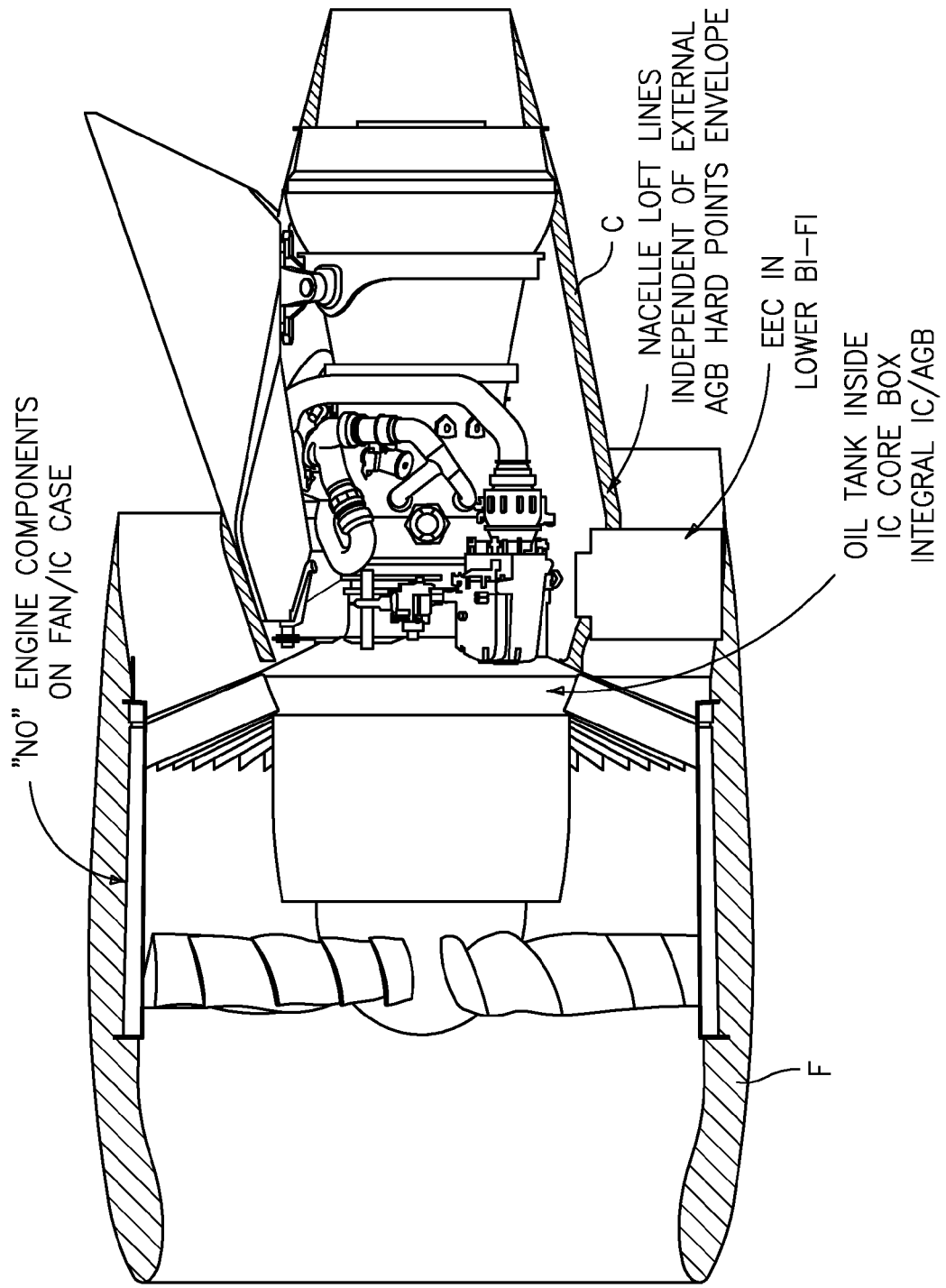
FIG. 5A is a side partially phantom view of an engine mounting configuration illustrating an auxiliary component mounting location to the intermediate case and high pressure compressor case.
Figure 5B:
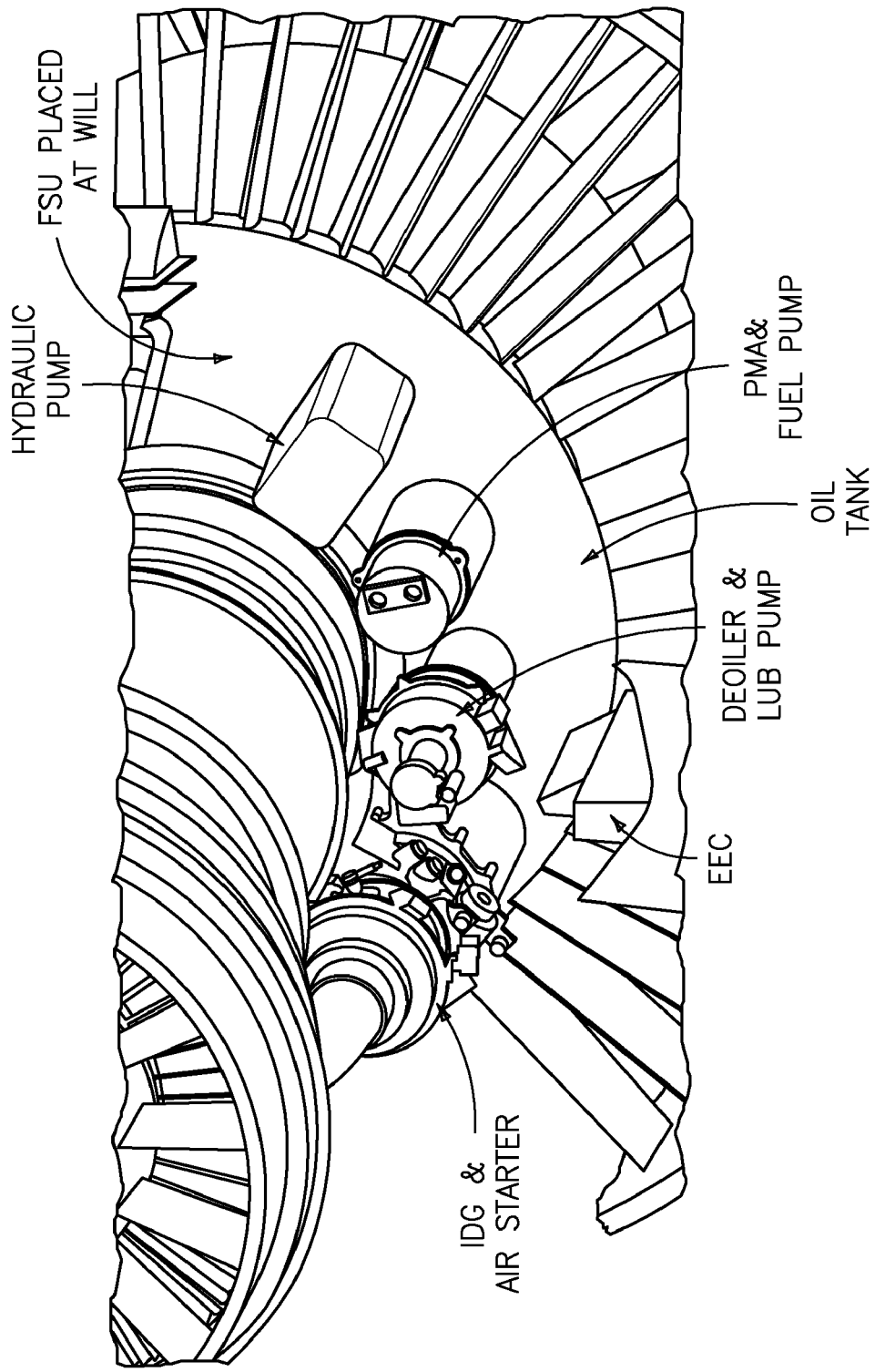
FIG. 5B is an underside of the gas turbine engine of FIG. 5A looking forward to illustrate the piggy-back of auxiliary components to the intermediate case.
Figure 5C:
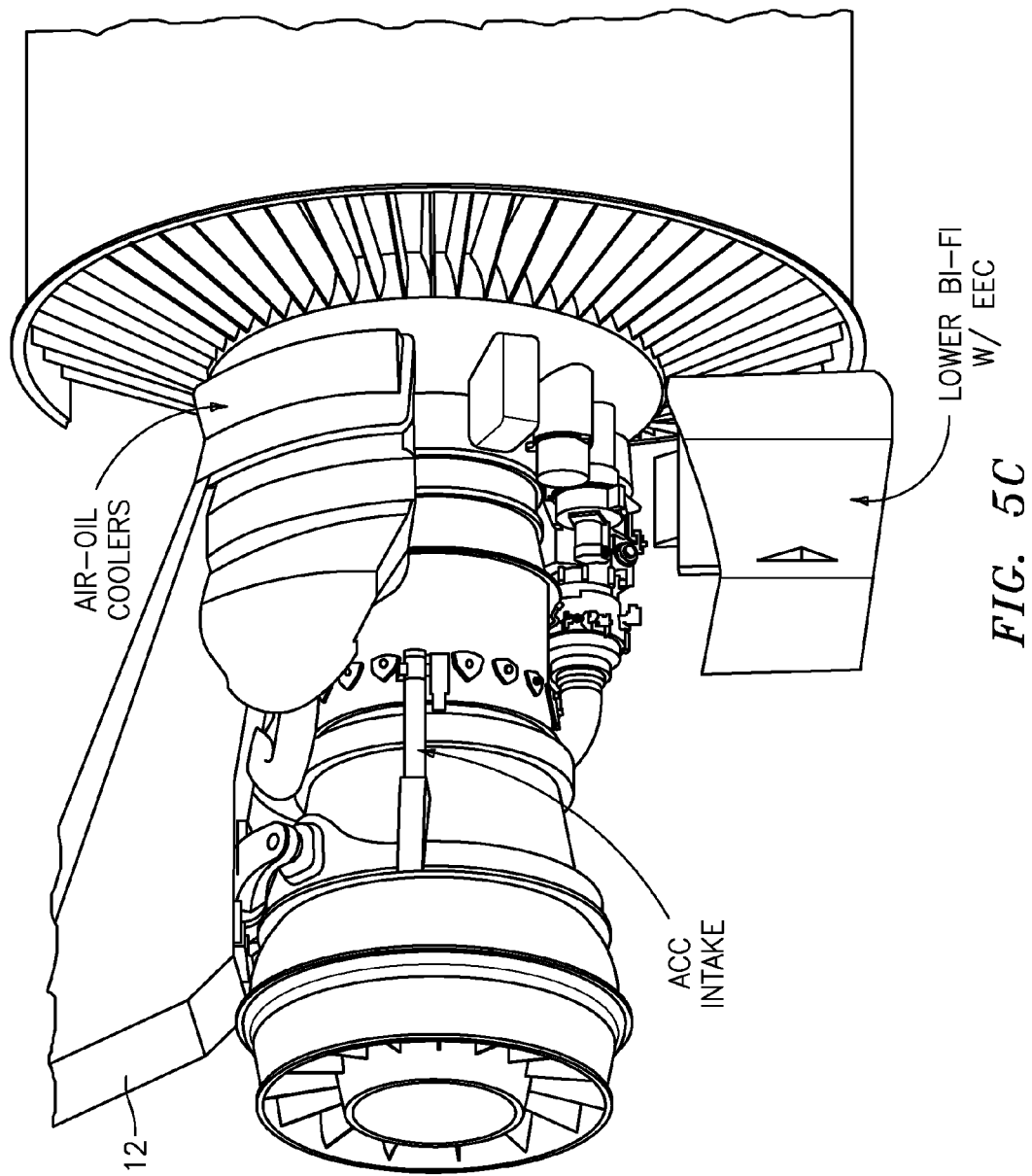
FIG. 5C is a side view of a gas turbine engine opposite FIG. 5A illustrating an auxiliary component arrangement facilitated by the engine mounting configuration.

The engine mounting configuration 80 eliminates the heretofore required thrust links from the IMC, which frees up valuable space adjacent the IMC 48 and the HPC case 50 within the core nacelle C (FIGS. 5A-5D) since IMC distortion in typical engine mount configurations is minimized. The IMC 48 and HPC case 50 may then be used to piggy-back auxiliary engine components such as the engine accessory gearbox AG, hydraulic pumps HP, fuel pumps FP, oil tank OT, air-oil coolers AOC (FIG. 5B), and such like which thereby saves weight and space within the core nacelle C. Further details of an IMC accessory mounting arrangement are disclosed in published United States Patent Application Number 20060248900 to Suciu, et al, which is herein incorporated by reference.

Figure 5D:
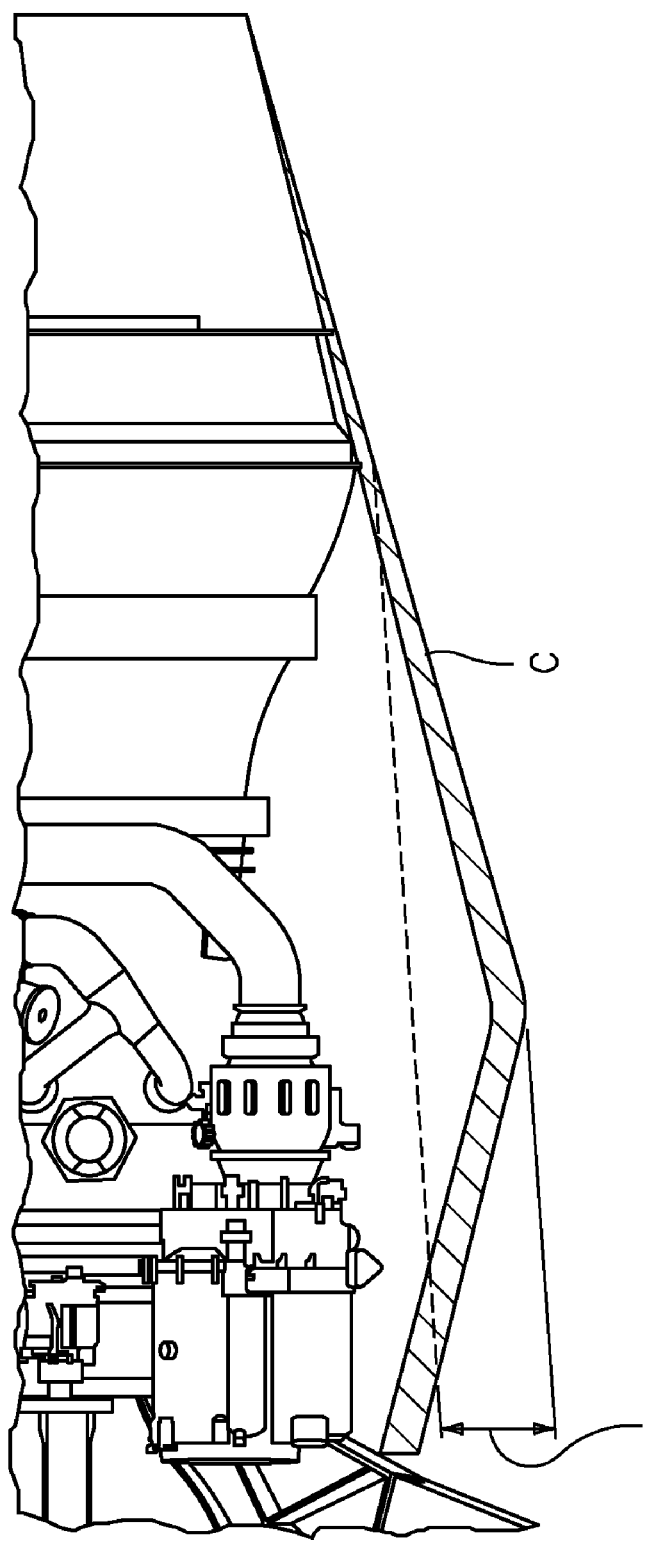
FIG. 5D is a side view of the gas turbine engine illustrating potential nacelle profile reduction facilitated by the engine mounting configuration due to elimination of a lay shaft requirement and moving the accessories forward.

The accessory gearbox AG may also be mounted directly to the IMC 48 thereby eliminating the conventionally required lay shaft. That is, the accessory gearbox AG mount location on the IMC 48 facilitates direct drive and a smaller diameter core nacelle C (FIG. 5D).

Figure 6:
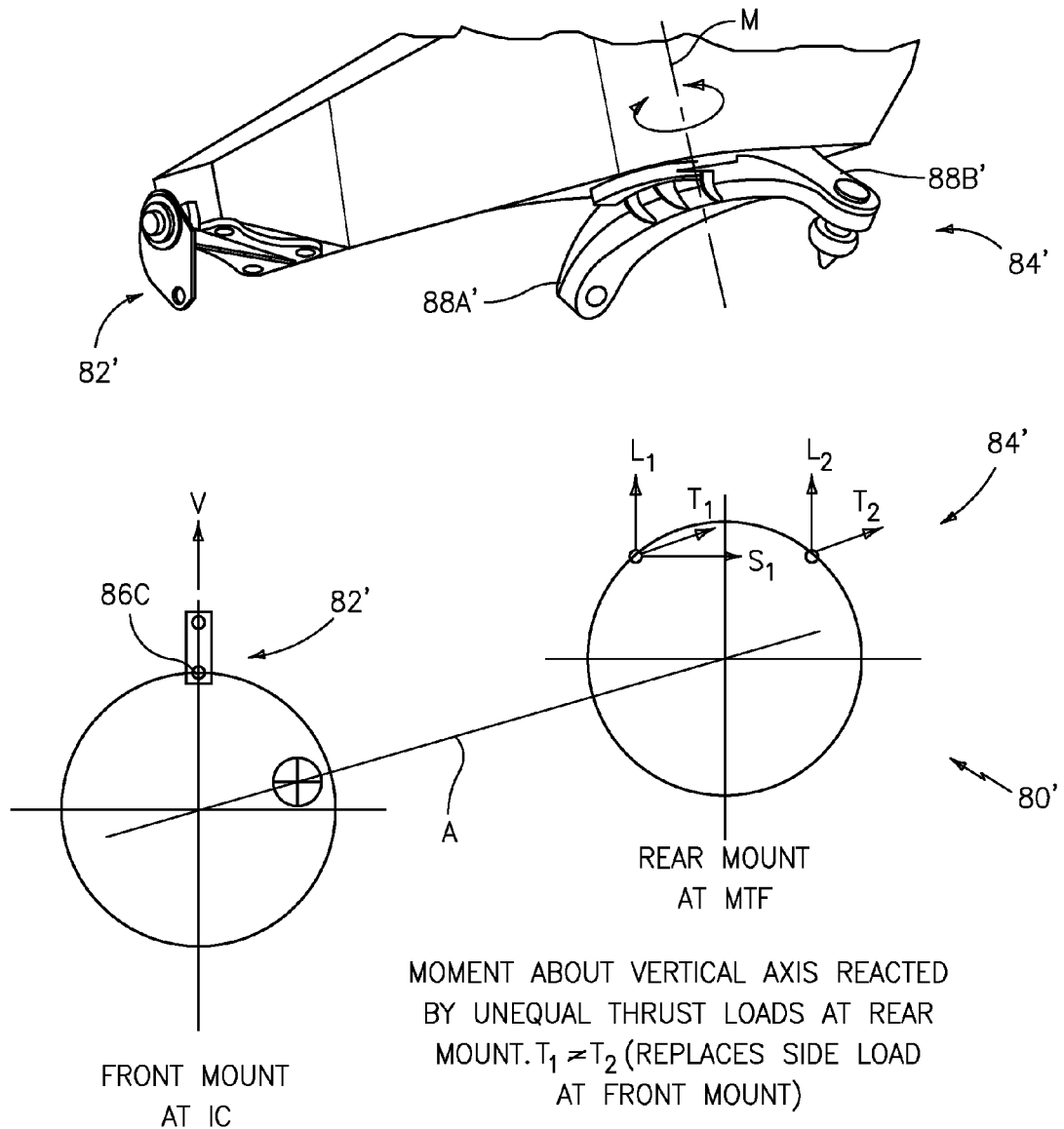
FIG. 6 is a free body diagram illustrating loads reacted by another engine mounting configuration.

Referring to FIG. 6, another engine mounting configuration 80' also reacts the engine thrust at the rear mount 84', but the forward mount 82' reacts only vertical loads V. The forward mount 82' mounts to the intermediate case (IMC) 48 at a single point 86C. The forward mount 82 is generally a plate-like member which is oriented transverse to the engine axis A such that a single fastener is oriented through the forward mount 82' to engage the IMC 48 generally parallel to the engine axis A.

The aft mount 84' includes a beam having a first arm 88A' and a second arm 88B' that mount to the MTF as described above. The first arm 88A' supports a link load L1, a side load S1, and a thrust load T1. The second arm 88B' supports a link load L2 and a thrust load T2. The aft mount 84' is rotationally fixed about axis M such that the side load is removed from the forward mount 82' and torque (link load) is carried by the unequal thrust loads (T1≠T2) at the aft mount 84'. That is, the side load is reacted as unequal thrust loads (T1≠T2) at the aft mount 84'.

Figure 7A:
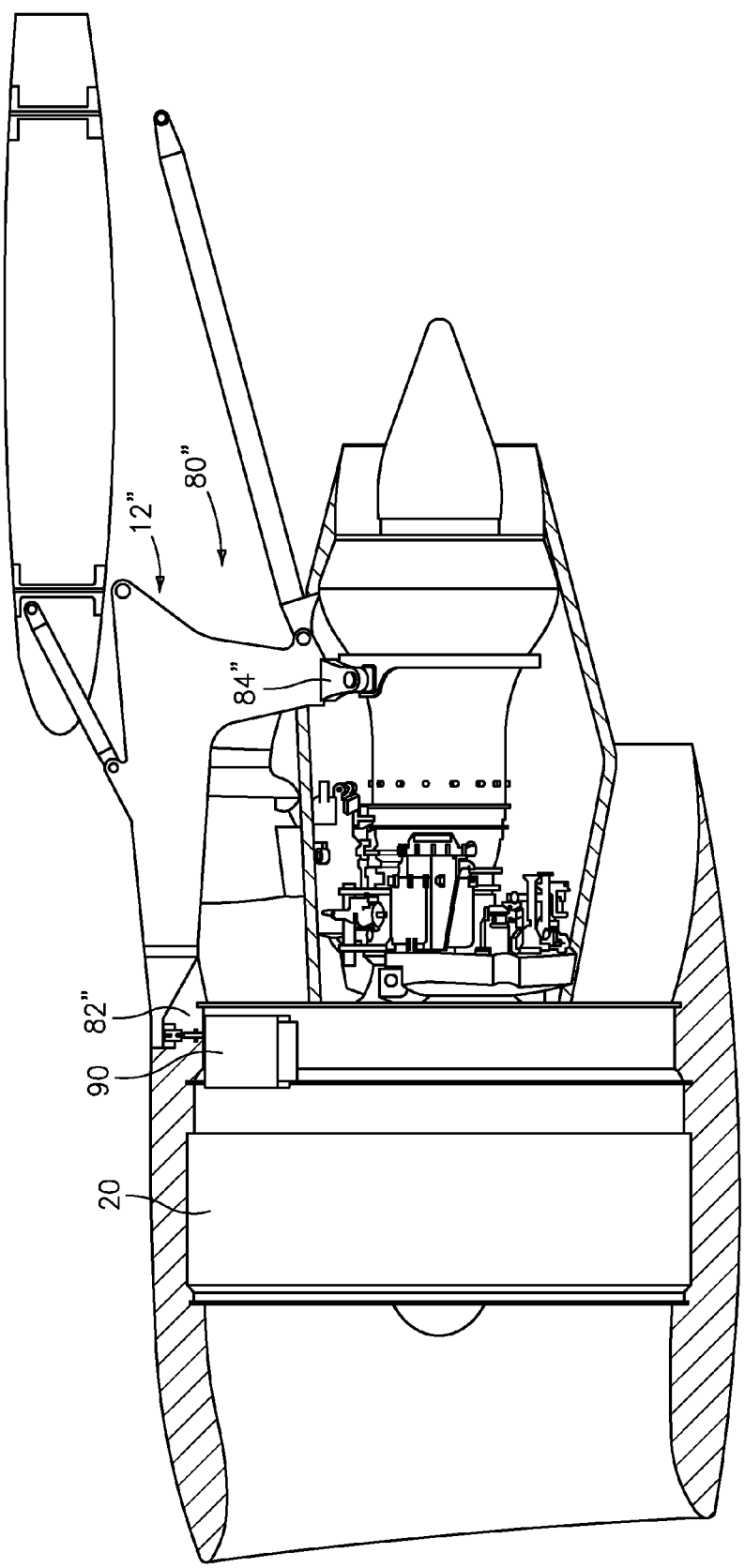
FIG. 7A is a side view of a gas turbine engine illustrating another engine mounting configuration in which the front mount of the pylon is attached to the outer periphery of the intermediate case.
Figure 7B:
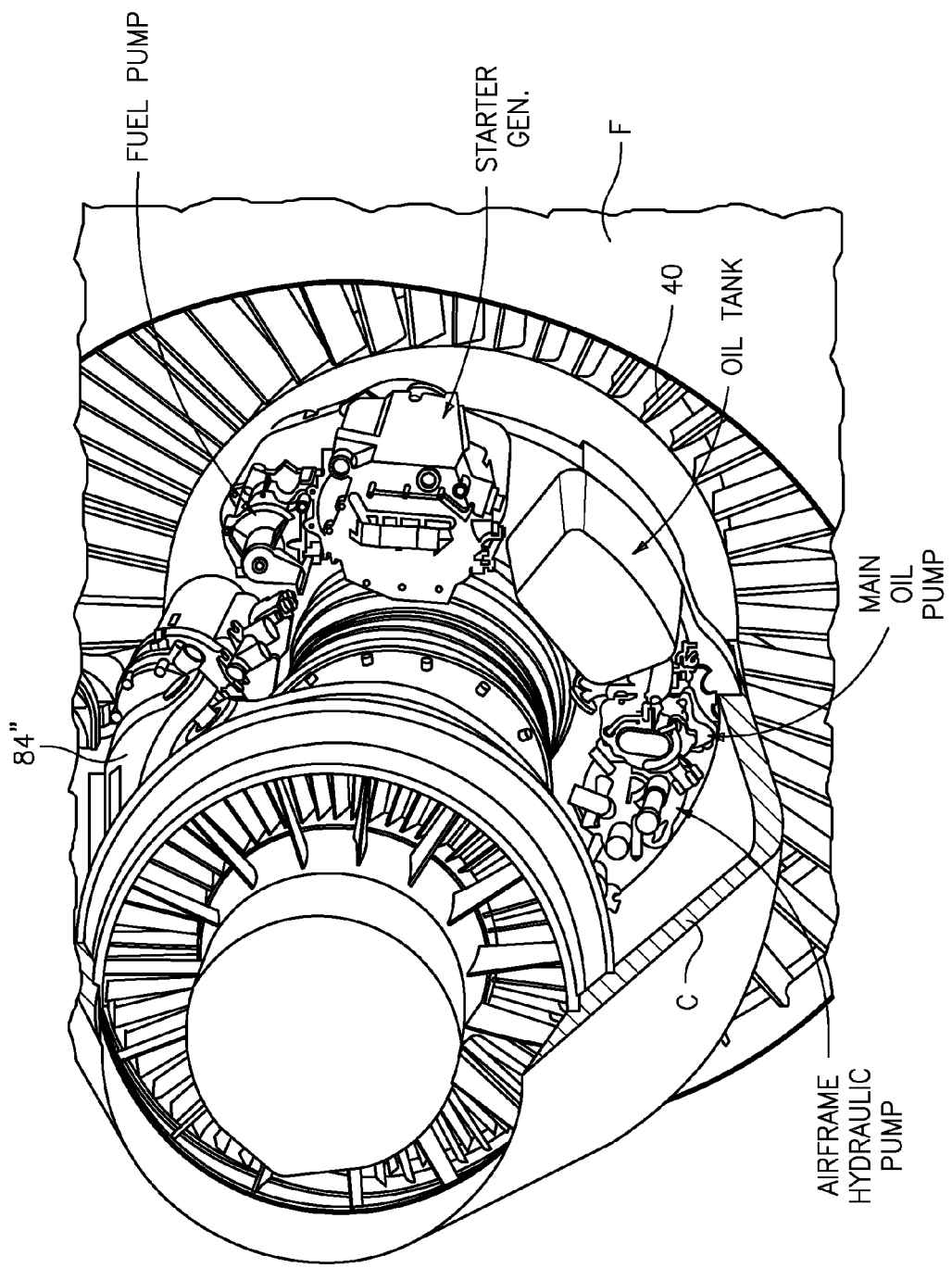
FIG. 7B is an underside view of the gas turbine engine of FIG. 7A looking forward to illustrate the piggy-back of auxiliary components with the intermediate case.
Figure 7C:
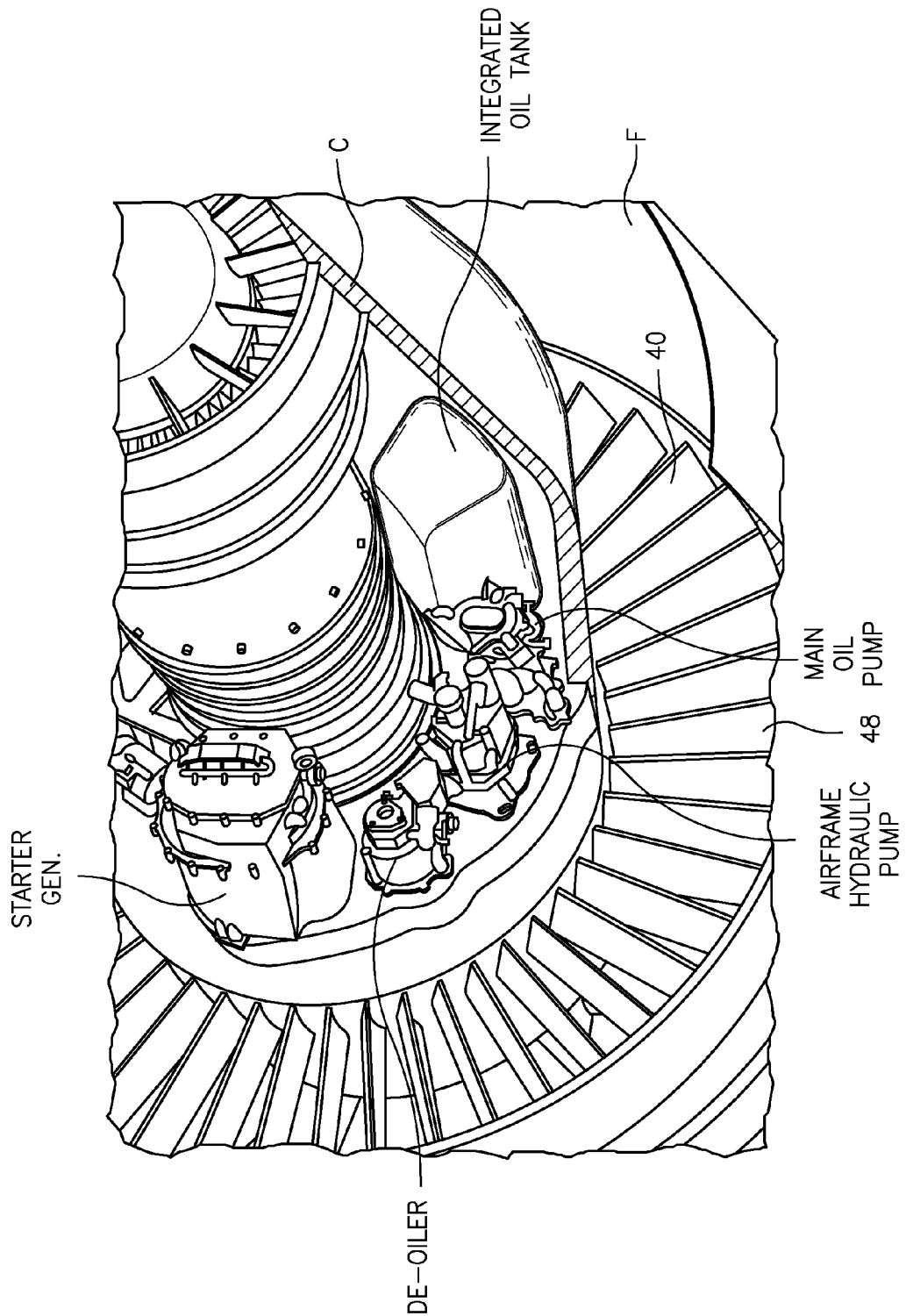
FIG. 7C is an underside of the gas turbine engine of FIG. 7A opposite FIG. 7B looking forward to illustrate the piggy-back of auxiliary components with the intermediate case.

Referring to FIG. 7A, another engine mounting configuration 80" also handles the engine thrust at the rear mount 84", but the forward mount 82" is mounted to the outer periphery of the IMC 48 at the fan case 20 outer diameter. A circumferential reinforcement plate 90 may be located about the outer periphery of the IMC 48 to receive front mount 82". The free body diagram of this configuration is generally equivalent to that illustrated in FIG. 3. The engine mounting configuration 80" further frees-up valuable space within the core nacelle (FIGS. 7B-7C) and aft of the IMC 48. That is, the IMC 48 provides significant radial area within the core nacelle C inboard of the struts 40 for use to piggy-back auxiliary engine components as described above and in the previously incorporated reference. Furthermore, significant aerodynamic profiling may be applied to the pylon 12".

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A gas turbine engine mounting configuration comprising:
   an aft mount which reacts at least a thrust load, said aft mount includes a beam having a first arm and a second arm;
   wherein said first arm includes a first attachment fastener and said second arm includes a second attachment fastener, said first attachment fastener and said second attachment fastener defined along a first and second attachment fastener axis which extends radially inward to intersect the engine axis.

2. The gas turbine engine mounting configuration as recited in claim 1, wherein said aft mount is attachable to a mid-turbine frame.

3. The gas turbine engine mounting configuration as recited in claim 2, wherein said aft mount is attachable between a first bearing and a second bearing supported by said mid turbine frame.

4. The gas turbine engine mounting configuration as recited in claim 1, wherein said aft mount is attachable to an engine thrust case.

5. The gas turbine engine mounting configuration as recited in claim 1, further comprising a forward mount forward of said aft mount along an engine axis, said forward mount reacts at least a vertical load.

6. The gas turbine engine mounting configuration as recited in claim 5, wherein said forward mount is attachable to an engine intermediate case.

7. The gas turbine engine mounting configuration as recited in claim 5, wherein said forward mount reacts a side load.

8. The gas turbine engine mounting configuration as recited in claim 5, wherein said forward mount is a generally planar member transverse to said engine axis.

9. The gas turbine engine mounting configuration as recited in claim 1, wherein said beam is fixed about a vertical axis which intersects said engine axis.

10. The gas turbine engine mounting configuration as recited in claim 1, wherein said beam is rotatable about a vertical axis which intersects said engine axis.

11. The gas turbine engine mounting configuration as recited in claim 1, wherein said beam is a single beam, said first and second arms defined by said beam.

12. The gas turbine engine mounting configuration as recited in claim 1, further including a pylori, said aft mount extending from said pylori, said pylori suspending an engine.

13. The gas turbine engine mounting configuration as recited in claim 12, wherein said beam is rotatable relative to said pylori.

14. The gas turbine engine mounting configuration as recited in claim 1, wherein the gas turbine engine mounting configuration excludes thrust links extending from an intermediate case.

15. The gas turbine engine mounting configuration as recited in claim 1, wherein said first and second arms are defined by said beam.

16. A gas turbine engine mounting configuration comprising:
 a pylori;
 an aft mount which reacts at least a thrust load, said aft mount extends from said pylori, said aft mount includes a beam having a first arm and a second arm, wherein said beam is rotatable about a vertical axis which intersects an engine axis; and
 a forward mount which reacts at least a vertical load, said forward mount extends from said pylori forward of said aft mount along said engine axis.

17. The gas turbine engine mounting configuration as recited in claim 16, wherein said forward mount reacts a side load.

18. The gas turbine engine mounting configuration as recited in claim 16, wherein said first arm includes a first attachment fastener and said second arm includes a second attachment fastener, said first attachment fastener and said second attachment fastener defined along a first and second attachment fastener axis which extend radially inward to intersect the engine axis.

19. The gas turbine engine mounting configuration as recited in claim 16, wherein said pylori suspends an engine.

20. The gas turbine engine mounting configuration as recited in claim 19, wherein said aft mount is rotatable relative to said pylori.

21. The gas turbine engine mounting configuration as recited in claim 16, wherein said beam is a single beam.

\* \* \* \* \*